July 23, 1929.   Z. W. DAVIS   1,721,658
APPARATUS FOR MOUNTING TIRE CHAINS
Filed April 30, 1926   2 Sheets-Sheet 2
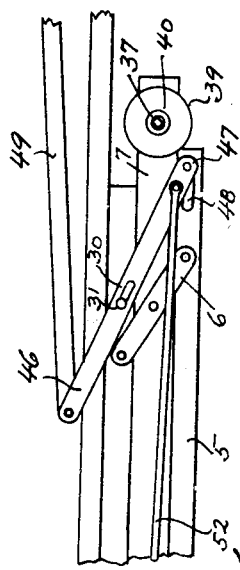
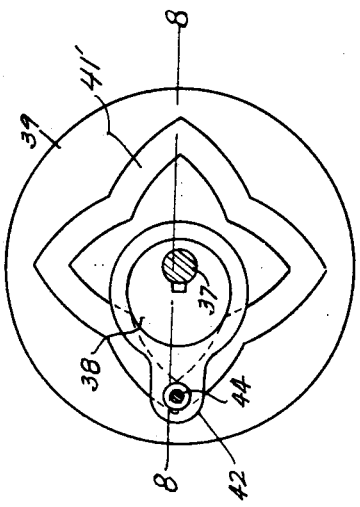
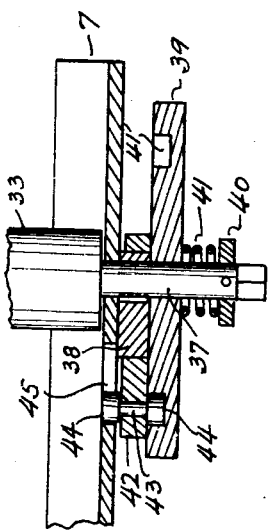
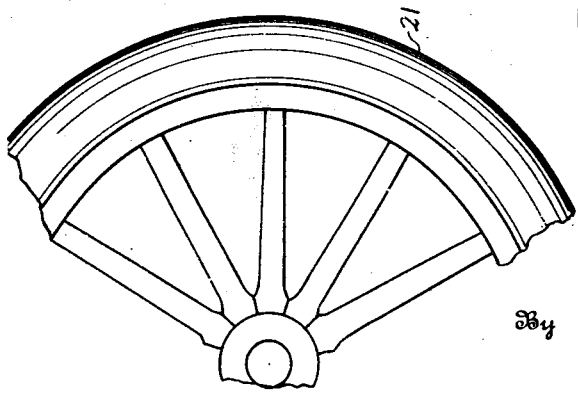

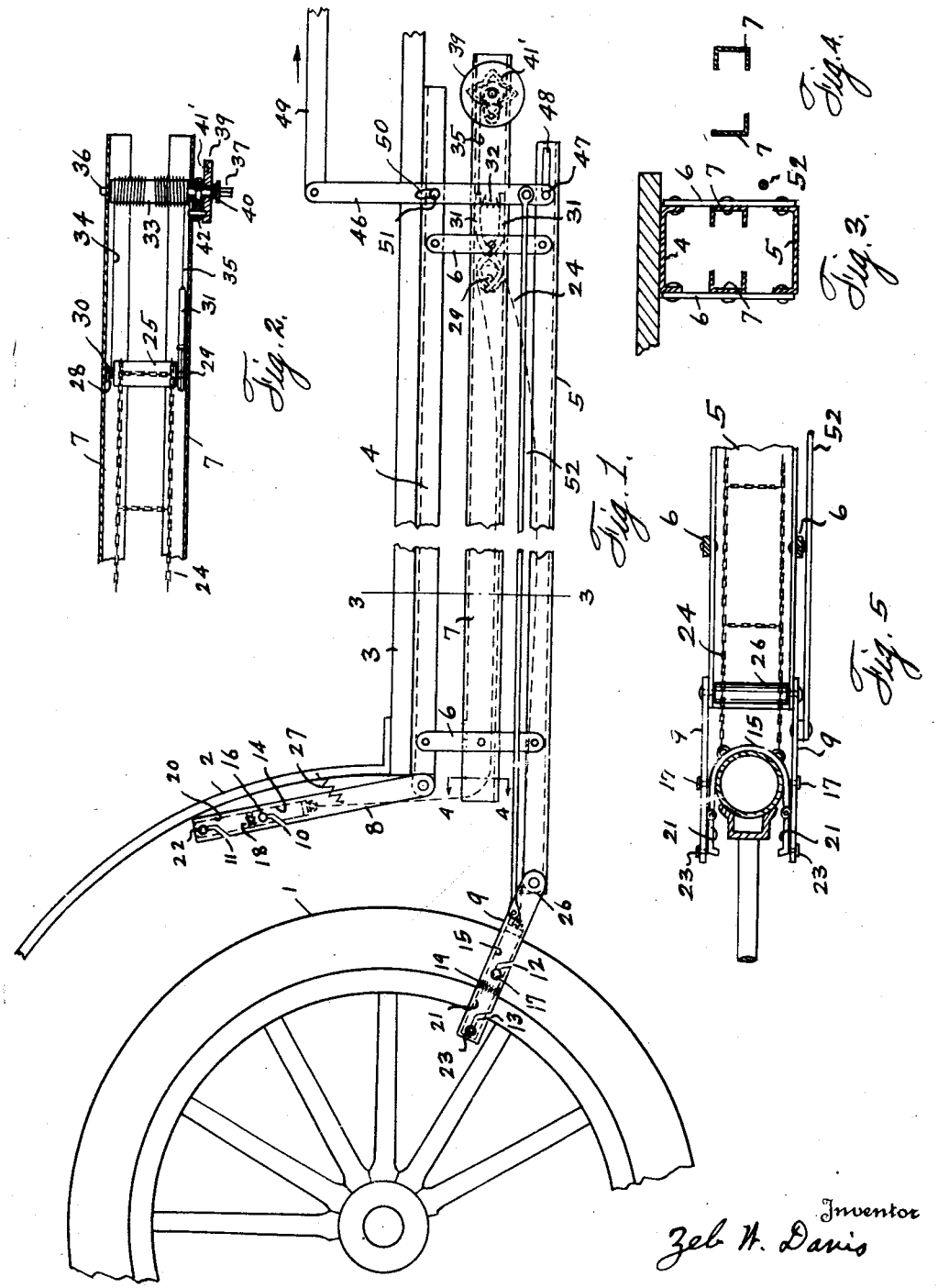

Patented July 23, 1929.

1,721,658

UNITED STATES PATENT OFFICE.

ZEB W. DAVIS, OF HOUSTON, TEXAS.

APPARATUS FOR MOUNTING TIRE CHAINS.

Application filed April 30, 1926. Serial No. 105,836.

This invention relates to new and useful improvements in an apparatus for mounting tire chains.

One object of the invention is to provide an apparatus of the character described adapted to be permanently mounted on a motor vehicle, and to carry an anti-skid tire chain, which may be applied to the corresponding vehicle wheel, through said apparatus, by the driver of the vehicle without dismounting from the vehicle.

Another object of the invention is to provide an apparatus of the character described which is compact and practical and may be applied to any type of motor vehicle and maintained in constant readiness for the application of anti-skid chains to the traction wheels in case of necessity.

With the above and other objects in view this invention has particular relation to certain novel features of construction, operation and arrangement of parts, an example of which is given in this specification and illustrated in the accompanying drawings, wherein:—

Figure 1 shows a side elevation of the apparatus as applied to a motor vehicle and shown in the operation of applying the anti-skid chains to the traction wheels of the vehicle.

Figure 2 shows a fragmentary sectional plan view thereof.

Figure 3 shows a cross sectional view taken on the line 3—3 of Figure 1.

Figure 4 shows a cross sectional view taken on the line 4—4 of Figure 1.

Figure 5 shows a fragmentary plan view of the device, partly in section.

Figure 6 shows a side elevation of the apparatus in collapsed or inactive position.

Figure 7 shows an enlarged side elevation of a drum controlling mechanism employed, shown partly in section, and Figure 8 shows a sectional view thereof taken on the line 8—8 of Figure 7.

Referring now more particularly to the drawings, wherein like numerals of reference designate similar parts in each of the figures the numeral 1 designates the traction wheel of the vehicle, the numeral 2 refers to the rear fender and the numeral 3 designates the foot board. The apparatus is shown mounted underneath the foot board although it is possible to mount it under the rear fender.

Fastened in an inverted position underneath the foot board there is a channel iron 4 and aligned underneath it there is a similar channel iron 5, the latter being swung from the former by the pairs of side links 6, 6, whose upper and lower ends are pivoted to the corresponding side flanges of said channels 4 and 5.

Between these upper and lower channel irons 4 and 5 and spaced from each, are the side channels 7, 7, which are supported by and pivotally connected with the corresponding links 6, 6.

Pivoted to the rear ends of the respective side flanges of the channels 4 and 5 respectively are the holder arms 8, 8, and 9, 9, whose under edges have the arcuate forwardly and downwardly curved slots 10, 10; 11, 11 and 12, 12; 13, 13, respectively.

Between these respective pairs of holder arms 8 and 9 are the arcuate clevises 14 and 15 which carry the lateral studs 16, 16, and 17, 17, which are retained in the respective slots 10 and 12. Connected, by spring hinges, as 18, 19, to the respective ends of the clevises 14, 15, are the clamp arms 20, 20, and 21, 21, which carry the lateral studs 22, 22 and 23, 23, which are retained in the respective slots 11, and 13 and thereby hold the clamp arms in open position.

An anti-skid chain 24 of conventional form has one end attached to the clevis 14 and it passes around the drum 25, and its other end is attached to the clevis 15, said chain operating over an anti-friction roller 26 mounted between the rear ends of the side flanges of the channel 5.

The holder arms 8 are normally held closely underneath the fender 2 by means of pull springs as 27, connected at one end to said fender and at their other ends to said respective arms.

The drum 25 has end pintles 28 and 29, the former of which is rotatable in a bearing block 30 which is slidable in one of the channels 7. In the other channel there is a bearing formed of the arms 31, 31, which are pivoted together, scissors fashion, and between the rear ends of which the pintle 29 has a bearing.

The forward ends of these arms 31, 31, are retained between the side flanges of the corresponding channel 7 and have the pressure spring 32 inserted between them.

Rotatably mounted between the forward ends of the channels 7, 7, there is a slack take up drum 33 around which the cables 34, 35, are wound, one of said cables being attached to the block 30 and the other to one of the arms 31. The drum 33 has the end pintles 36, 37, which have bearings in the respective channels 7, 7, and the pintel 37 is extended beyond its channel and formed polygonal to receive a crank by means of which the drum 33 may be rotated. Fixed on the pintle 37 adjacent the corresponding channel 7 there is an eccentric 38. Adjacent the outer side of said eccentric and loosely mounted on the pintle 37 there is a disc 39. Pinned onto the outer end of said pintle 37 there is a collar 40 and a coil spring 41 surrounds said pintle 37 and is interposed between the collar 40 and the disc 39.

The inner side of the disc 39 has an irregular face cam 41' forming a continuous track about its axis of rotation, a quatrefoil cam being shown.

There is an eccentric arm 42 one end of which has a bearing on the eccentric 38 and the other end of which carries a cross pin 43 whose ends have roller bearings 44, 44, one of which runs in the track 41' and the other of which runs in the oblong bearing 45 in the adjacent channel 7.

There is a manipulating arm 46 whose lower end has a lateral stud 47, which works in a long bearing 48 in the forward end of the channel 5 and whose upper end is pivotally connected to the rear end of the link 49, whose forward end is connected to a suitable lever, or pedal, (not shown) accessible from the driver's seat. The lever 46 has an intermediate oblong bearing 50 which works on a lateral bearing stud 51 projecting from the channel 4.

A rod 52 is pivoted, at its forward end, to the lever 46, near its lower end, and the rear end of this rod is pivotally connected to the corresponding holder arm 9.

It is to be noted that an apparatus is mounted on each side of the vehicle to simultaneously apply an anti-skid chain to each traction wheel.

Normally the apparatus will be in collapsed position, as shown in Figure 6, the foot pedal through which it is operated being equipped with the usual spring to hold it in rearward position.

In order to apply the chains the foot pedal is thrown forward through the link 49 to carry the channels 5 and 7, 7, downwardly and rearwardly and will also impart a rearward thrust to the rod 52 forcing the holder arms 9 into position embracing the tire and rim of the wheel 1. The clevis 15 will strike against the tire and be stopped, but an additional thrust on the rod 52 will carry the arms 9 on further back, disengaging the studs 17, and 23 from the respective slots 12 and 13.

It is to be noted that the vehicle is in motion when the chains are applied, so that the clevis 15 is carried downwardly by friction with the tire, and this assists in the disengagement of the studs from the slots of the arms 9. Thereupon the spring hinges 19 immediately carry the clamps 21 into engagement with the wheel felly. One end of the chain 24 is thus attached to the wheel 1, and as the wheel rotates it winds said chain around the wheel, the drum 25 moving rearwardly and the cables 34, 35 unwinding from the drum 33. As the drum 33 turns, the cam 38 will reciprocate the arm 42 and the roller 44 in traveling in the quatrefoil cam groove 41' will rotate the disc 39 but the resistance of the spring 41 will cause the disc 39 to lag, by reason of friction, thus causing the drum 33 to turn slowly so that the chain 24 will be held taut as it is wound on the wheel 1.

The rear end of the upper flange of the channel 7, in which the arms 31 run is cut away, as shown in Figure 4 so that when the forward end of the arm 31, which rides against said upper flange reaches said cut away portion the spring 32 forces said end of said arm upwardly and opens the bearing in which the pintle 29 is held and this will permit the drum 25 to swing around and release the chain 24 and the pull exerted by the wheel 1 on said chain will now pull the arms 8 downwardly, and carry the clevis 14 around the tire. As said wheel rotates, it will carry the clevis 14 on by friction disengaging the studs 16 and 22 from the slots 10, 11 and the clamps 20 will be engaged around the wheel felly by the spring hinges 18 and thereupon the spring 27 will carry the arms 8 back up closely against the underside of the fender 2, and the chain will then be secured in position about the wheel tire. The drum 25 will hang in the bearing in the block 30 to prevent its loss.

When firm ground is reached the chain may be taken from the wheel and its ends reattached in the arms 8 and 9 and then looped around the drum 25 and the pintle 29 of said drum replaced in its bearing, and the drum 33 then rotated to take up the slack in the chain. In rotating the drum 33 an ordinary lug wrench, usually carried in the tool kit of a motor vehicle, may be applied to the outer end of the pintle 37 and used for this purpose.

What I claim is:—

1. An apparatus for applying an anti-skid chain to a vehicle wheel during the rotation of said wheel and including wheel engaging means attached to the respective ends of said chain, a mechanism forming a chain carrier adapted to be carried by the vehicle and including pivotally mounted holders releasably secured to the respective wheel engaging means, means for actuating said mechanism to carry one of said holders into position to apply one of said engaging means to the wheel, the other holder being disposed to be carried by said chain, as it is wound on the wheel, into position to apply the other engaging means to said wheel and means automatically restoring the last named holder to its original position.

2. An apparatus for applying an anti-skid chain to a vehicle wheel, while said wheel is rotating, and including wheel engaging means attached to the respective ends of said chain, a mechanism adapted to be attached to and permanently carried by the vehicle and forming a chain carrier, said mechanism including pivotally mounted holders releasably secured to the respective wheel engaging means, means acting through said mechanism and effective to operate one of said holders into position to apply one of said engaging means, said chain, as it is carried around the wheel while the wheel is rotating, forming means adapted to actuate the other holder into position to apply the other engaging means to the wheel, a fed drum operatively connected with the chain and means effective to retard the rotation of said drum to hold the chain taut as it is fed onto the wheel.

In testimony whereof I have signed my name to this specification.

ZEB W. DAVIS.